United States Patent Office 3,321,025
Patented May 23, 1967

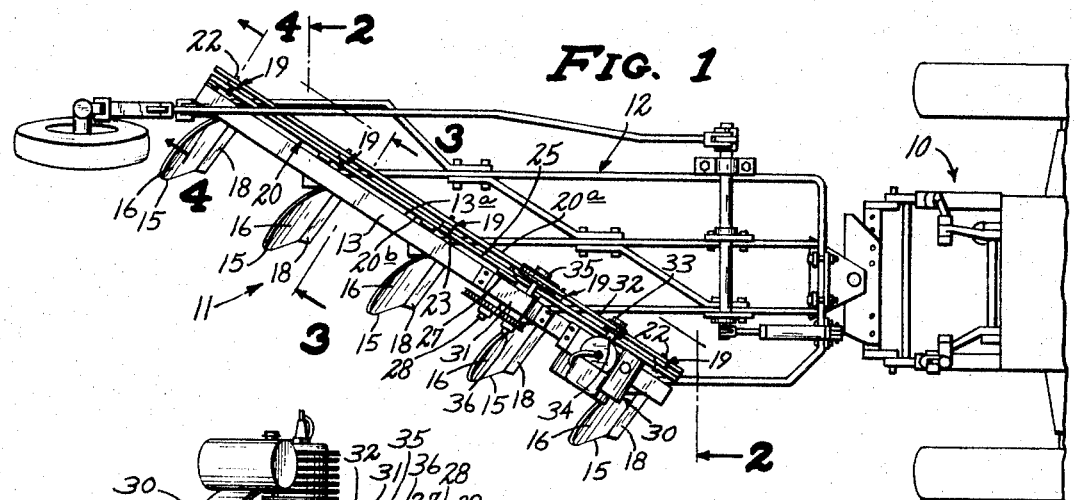

3,321,025
TRASH REMOVER FOR PLOWS
Henry A. Ellefson and Gordon H. Ellefson, both of 403 Grant St., Jackson, Minn. 56143
Filed Sept. 8, 1964, Ser. No. 394,937
2 Claims. (Cl. 172—39)

Our invention relates generally to farm implements, and more specifically to trailing plows, particularly those of multiple bottom construction.

Such plows have frame structure including a backbone disposed diagonally of the path of travel, a plurality of beams carried by and depending from said backbone in longitudinally spaced relationship therealong and a plow bottom secured to and carried by the lower end portion of each of said beams.

Frequently during plowing, heavy trash, such as weeds or roots, become entrained over or build up on the beams associated with each plow bottom instead of passing therebetween. As trash builds up on each beam, the plow as a unit becomes increasingly inefficient and eventually requires a shut-down period for manual removal of such trash by the operator.

Previously attempts to prevent such trash build up have been made by the use of colters carried by the frame structure of said plow and disposed one each directly ahead of one of said plow bottoms. Such devices, while being adequate under normal conditions, fail to prevent build up of trash during heavy trash conditions.

It is, therefore, a principal object of our invention to provide a device which will positively prevent trash from accumulating on said beams under all conditions of plowing.

It is another object to provide a device which is extremely durable, simple in construction, and which requires but a minimum of service.

A still further object is to provide a device which is adaptable to be mounted to plows having frame structures of different designs.

The above and still further objects of our invention will become apparent from the following detailed specification, appended claims, and attached drawings.

Referring to the drawings wherein like characters indicate like parts throughout the several views:

FIG. 1 is a view in top plan of a conventional trailing plow showing our novel device attached thereto;

FIG. 2 is a view in vertical section as seen from the line 2—2 of FIG. 1 on a slightly enlarged scale;

FIG. 3 is an enlarged view in vertical section as seen from the line 3—3 of FIG. 1; and FIG. 4 is a greatly enlarged fragmentary view in section as seen from the line 4—4 of FIG. 1.

Referring with greater particularity to the drawings, the numeral 10 indicates a conventional tractor to which is attached a conventional trailing plow identified in its entirety by 11. Plow 11 comprises frame structure 12, including a backbone member 13 which extends diagonally to the direction of travel of the tractor 10. Rigidly secured to and depending from the backbone 13, at longitudinally spaced points therealong, are a plurality of substantially similar beams 14 each having secured to their lower ends a plow bottom 15, the moldboards of which are identified by 16, the shins by 17, and the shares by 18.

Operatively secured intermediate their ends forwardly of the face 13a of the backbone 13, one each in forwardly disposed relationship to one of said beams 14, are a plurality of rigid arm-like trash-removing members 19. As shown, the arms 19 are thus mounted for pivotal swinging movements of their lower ends 19a in a common plane parallel to the longitudinal axis of the backbone 13. Furthermore, as shown particularly in FIG. 3, each of the trash-removing arms 19 is in generally overlying relationship to the forwardly disposed portions of the plow bottoms 15, particularly the shins 17. It will be noted that the arms 19 have generally vertically disposed straight parallel side edge portions which render them self-cleaning.

Securing the upper end portions 19b of the trash-removing arms together for common movements, is a tie bar means 20, shown as including forwardly and rearwardly disposed tie bar elements 20a and 20b, respectively, which connect said arms 19 together at points radially offset from their pivotal connections 21 to the backbone 13, as indicated at 22.

Preferably, and as shown, one of the elements 19, identified at 23, has an upwardly extended end 24 to which is pivotally secured one end of a pitman arm 25, as indicated at 26. The opposite end of the pitman 25 is secured to a rotary member 27 in offset relationship to the axis 28 thereof, as indicated at 29. In conventional manner, rotation is imparted to the rotary member 27 through the medium of an internal combustion engine 30 rigidly mounted on the backbone 13, and a power transmission unit 31 which has drive connections with the engine 30 through the medium of V-belts 32 entrained over a pulley 33 on the engine drive shaft 34 and a second rigidly secured pulley 35 on the driven shaft 36 associated with said power transmission unit 31. Obviously, various other drive means may be employed, such as hydraulic motors or the power take-off associated with the tractor 10. The combustion engine 30 is being used only by way of example.

When a conventional trailing plow 11 with our novel trash-removing device applied thereto is in operation, the reciprocating trash-removing arms 19 will positively prevent trash from accumulating on the beams 14 immediately above the shins 17 at points indicated at 37. Rather, such trash, as it rides up the shins 17, is engaged by the lower ends 19a of the arms 19 and deposited on opposite sides of its respective beam 14. So as to enable the operator to adjust the extent of swinging movements of the trash-moving arms 19, the upper end 24 of the arm 23 is provided with a longitudinally extended slot 38 for adjustable reception of the pivotal connection 26.

Our invention has been thoroughly tested and found to be completely satisfactory for the accomplishment of the above objects; and while we have disclosed a preferred embodiment thereof, same may well be capable of modification without departure from the scope and spirit of the appended claims.

What is claimed is:
1. In a device of the class described:
 (a) frame structure including a backbone member extending diagonally in the direction of travel,
 (b) a plurality of beams carried by and depending from said backbone in longitudinally spaced relationship therealong,
 (c) a plow bottom secured to and carried by the lower end of each of said beams,
 (d) a plurality of trash-removing members, one each generally forwardly of one of said beams,
 (e) said members being in the nature of generally vertically disposed arms operatively secured to said frame structure for reciprocating movements in a common plane generally parallel to the longitudinal axis of said backbone and in overlying relationship one each to the forwardly disposed portion of one of said plow bottoms,
 (f) said members being relatively rigid and defining straight opposite self-cleaning edge portions,
 (g) said arms being pivotally secured intermediate their ends to said frame structure for pivotal swinging movements of the lower ends thereof, and power means for simultaneously imparting said movements to said trash-removing members, and including:
  (1) a rotary member,
  (2) a tie bar pivotally connected to each of said trash-removing members in radially offset relationship to the pivotal connection of each thereof, and
  (3) a pitman arm pivotally secured at one end to said rotary member and operatively secured at its opposite end to said trash-removing members.

2. The structure defined in claim 1 in further combination with means for adjustably varying the extent of swinging movements of said trash-removing members.

References Cited by the Examiner

UNITED STATES PATENTS

| 147,036 | 2/1874 | Blue | 172—39 X |
| 2,385,785 | 10/1945 | Beasley et al. | 172—30 |
| 2,877,857 | 3/1959 | Baasen | 172—66 X |
| 3,152,648 | 10/1964 | Wildt et al. | 172—39 X |

FOREIGN PATENTS 194,179  12/1957  Austria.

ABRAHAM G. STONE, *Primary Examiner.*

WILLIAM A. SMITH III, *Examiner.*